US012583392B1

(12) United States Patent    (10) Patent No.:   US 12,583,392 B1

Wilks, Jr.            (45) Date of Patent:     Mar. 24, 2026

(54) LOCAKABLE ISOFIX CONNECTION DEVICE AND METHOD OF SECURING AN OBJECT TO A VEHICLE SEAT

(71) Applicant: David Reign Wilks, Jr., Tillamook, OR (US)

(72) Inventor: David Reign Wilks, Jr., Tillamook, OR (US)

( * ) Notice: Subject to any disclaimer, the term of this patent is extended or adjusted under 35 U.S.C. 154(b) by 135 days.

(21) Appl. No.: 18/588,972

(22) Filed: Feb. 27, 2024

Related U.S. Application Data

(60) Provisional application No. 63/606,746, filed on Dec. 6, 2023.

(51) Int. Cl.
     *B60R 7/04*        (2006.01)
     *B60N 2/28*       (2006.01)

(52) U.S. Cl.
     CPC ............ *B60R 7/043* (2013.01); *B60N 2/2887* (2013.01)

(58) Field of Classification Search
     CPC ............................... B60N 2/2887; B60R 7/043
     USPC .......................................... 224/275; 297/253
     See application file for complete search history.

(56) References Cited

U.S. PATENT DOCUMENTS

| | | | |
|---|---|---|---|
| 4,711,493 | A | 12/1987 | Schrom et al. |
| 6,276,582 | B1 | 8/2001 | Alexander |
| 6,494,535 | B2 | 12/2002 | Galbreath |
| 6,681,969 | B1 * | 1/2004 | Giedeman, III ........ B60R 7/043 |
| | | | 297/188.2 |

| | | | |
|---|---|---|---|
| 7,384,099 | B2 * | 6/2008 | Schleif ................. B60N 2/2887 |
| | | | 297/217.2 |
| 7,452,020 | B2 | 11/2008 | Warsi et al. |
| 8,100,474 | B2 * | 1/2012 | Christ .................... B60N 2/289 |
| | | | 297/253 |
| 8,240,761 | B2 * | 8/2012 | Clement .............. B60N 2/2893 |
| | | | 297/253 |
| 8,366,192 | B2 * | 2/2013 | Clement .............. B60N 2/2875 |
| | | | 297/217.2 |
| 8,926,014 | B2 * | 1/2015 | Su ........................ B60N 2/2863 |
| | | | 297/250.1 |
| 9,015,911 | B2 | 4/2015 | Xu |
| 9,421,889 | B2 * | 8/2016 | Minato ................ B60N 2/2887 |
| 9,707,867 | B2 * | 7/2017 | Mo ....................... B60N 2/2887 |
| 11,912,174 | B2 * | 2/2024 | Harmes, V .......... B60N 2/2821 |

(Continued)

FOREIGN PATENT DOCUMENTS

| | | | |
|---|---|---|---|
| CN | 207523501 U | * | 6/2018 |
| CN | 212950275 U | * | 4/2021 |

(Continued)

OTHER PUBLICATIONS

Machine Translation of Qian CN207523501 U (Year: 2018).*

*Primary Examiner* — Justin M Larson

(74) *Attorney, Agent, or Firm* — John Rizvi; John Rizvi, P.A.—The Patent®

(57)           ABSTRACT

An ISOFIX connection device is provided herein which has a lock that prevents the release of the adjustment mechanism of the ISOFIX latch in the ISOFIX mechanism. By employing a key, a user can engage a keyed latch to block the components of the adjustment mechanism from being squeezed together, thus, preventing the disengagement of the ISOFIX latch. The ISOFIX connection device can prevent undesired removal of the object by a child or through theft. There is also provided a method of securing an object to a vehicle seat employing the ISOFIX connection device.

19 Claims, 5 Drawing Sheets

(56) References Cited

U.S. PATENT DOCUMENTS

| 2008/0073948 | A1 | 3/2008 | Livingston et al. |
| 2008/0309062 | A1 | 12/2008 | Fowler et al. |
| 2022/0234538 | A1 | 7/2022 | Buttolo et al. |

FOREIGN PATENT DOCUMENTS

| DE | 102018105535 | A1 | * | 9/2019 | ............. | B60R 7/043 |
| DE | 102020123342 | A1 | * | 3/2022 | ........... | B60N 2/2887 |
| WO | WO-2024223657 | A1 | * | 10/2024 | ........... | B60N 2/2887 |

* cited by examiner

LOCAKABLE ISOFIX CONNECTION DEVICE AND METHOD OF SECURING AN OBJECT TO A VEHICLE SEAT

CROSS-REFERENCE TO RELATED APPLICATIONS

This application claims the benefit of U.S. Provisional Patent Application Ser. No. 63/606,746, filed on Dec. 6, 2023, which is incorporated by reference herein in its entirety.

FIELD OF THE INVENTION

The present invention relates generally to the field of securing of objects. More particularly, the present invention relates generally to the field of securing objects in vehicles.

BACKGROUND OF THE INVENTION

With the advent of vehicles has come the advent of child restraint systems therein. While in during the early years of automobiles, there was no requirement for the securing of children in car seats, this has changed over the latter part of the 20th century and continues to the present. There are increasing demands on automakers to produce automobiles which are equipped with mechanisms for employing child restraint systems therein.

In the early part of the $21^{st}$ century, a car seat was, and many times still is secured to the seat of a vehicle by using the vehicles provided seat belt restraint system. Specifically, the seat belt can be run through provided openings in the car seat base and tightened to secure the child seat base to the car seat. Then a car seat can be placed in and out of the base as is desired. Different car seat shapes, shorter seat belt lengths and different anchor point locations can cause some child seats to be positioned further forward or further back, making it a challenge to create a child seat that fits all vehicle types, and which can be effectively secured with a car's provided restraint system. Further, the use of an automotive seat belt in such a fashion can raise the risk that the belt is installed incorrectly, which can risk serious injury to a child placed in the car seat.

Thus, with increased safety standards most vehicles are now required to be equipped with an ISOFIX car seat attachment system therein. The full name of ISOFIX is "International Standards Organization FIX", which is a new standard for placing child seats in cars. The ISOFIX connection device fixes the child safety seat to the back seat of the car through an interface provided on the back seat of the car that can cooperate with the ISOFIX connector. Various different models of ISOFIX connectors can be employed but they all generally employs, springs, limiting members, inclined planes and other components which are know to those of ordinary skill in the art to actuate a latch at the end of the ISOFIX connector which can be affixed to an anchor such as a ISOFIX bracket welded to the automotive frame, and which is accessible along the joint of a back seat of a vehicle.

While these ISOFIX connectors can be moved to different lengths using rails and an adjustment mechanism, the adjustment mechanism is readily open and available to any passenger in the automobile from being actuated, whether the automobile is in motion or not. Thus, another child in the vehicle seated near the car seat could readily disengage the adjustment mechanism and release the ISOFIX connector at an inopportune time.

Further, the ISOFIX rails could also be subject to theft if left in an unlocked vehicle in that there is no means of securing the ISOFIX rails in the automobile or preventing their unwanted disengagement from the vehicles automotive anchor system.

Accordingly, there remains a need for a solution to at least one of the aforementioned problems. For instance, there is an established need for a means to secure ISOFIX connectors and/or rails in a vehicle such that they cannot be removed or have the ISOFIX connector latch disengaged when not intended.

SUMMARY OF THE INVENTION

The present invention can be directed to an ISOFIX connection device is provided herein which has a lock that prevents the release of the adjustment mechanism of the ISOFIX connection device, which adjustment mechanism controls the latch in the ISOFIX connectors. By employing a key, a user can engage a keyed latch to block the components of the adjustment mechanism from being squeezed together, thus, preventing the disengagement of the ISOFIX latch. The ISOFIX connection device can prevent undesired removal of the object by a child or through theft. There is also provided a method of securing an object to a vehicle seat employing the ISOFIX connection device.

The term "about" as used herein can entail a variance of 10% greater or lower than the value recited.

The term "comprising" as used herein also encompasses the terms "consisting essentially of" and "consisting of".

The values of any endpoint(s) of any range(s) recited herein can be used to create different ranges or different endpoints of ranges to those described herein. The endpoints in any of the ranges described herein can also include any integer value in the recited range even if not expressly described. Thus, for example, a range of from 1.0 to 10 can include as alternate range endpoints any integer between 1 and 10, such as, the non-limiting integer examples of 2, 3, 4, 5, 6, 7, 8 and 9.

In a first implementation of the invention there can be provided a lockable ISOFIX connection device comprising:

a pair of ISOFIX connectors each having an engageable ISOFIX latch;

a pair of rails wherein each rail supports and encloses a portion of one of the ISOFIX connectors; and, an adjustment mechanism located on an exterior of at least one of the rails which is capable of releasing movement of the connectors within the rails and capable of engaging and disengaging the ISOFIX latch, and wherein the adjustment mechanism has a lock component, which when locked, prevents the adjustment mechanism from releasing movement of the connector and disengagement of the ISOFIX latch.

In one aspect of the invention, the ISOFIX connective device can be attached to a surface of an object to be secured, preferably by the pair of rails, preferably along a bottom of the object, such that the rails make contact with a lower part of a seat of the vehicle (i.e., the portion designed to accommodate the lower part of the body of the person sitting).

In another aspect of the invention, the object can be selected from a tool box, a lock box, and a cooler, although any object to which the rails can be affixed can be employed.

In yet another aspect of the invention, each of the rails can contain a separate adjustment mechanism located on an exterior side thereof, i.e., the side facing away from the object to which the rails can be attached.

In yet even another aspect of the invention, the ISOFIX latch can be located at a terminus of the ISOFIX connectors and can be mechanically connected to the adjustment mechanism. The ISOFIX connectors employed herein can comprise at least two, although the use of three, four or more connectors is contemplated depending on the size of the object to be secured.

In yet one other aspect of the invention, the adjustment mechanism can be engageable by squeezing two opposing components in together in opposing directions. The adjustment mechanism can be any adjustment mechanism that is used on any ISOFIX connectors. The ISOFIX connectors can be any one of the commercially available ISOFIX connectors which are known to those of ordinary skill in the art. The internal operation of the ISOFIX connectors described herein will not be discussed in detail since such is known to those of ordinary skill in the art.

In yet even one other aspect of the invention the lock can be a keyed lock which engages a latch, on the opposing side of the keyed side, which latch enters a space which blocks the two opposing components from being squeezed together in opposing directions in the normal fashion of releasing the latch of the ISOFIX connector. Preferably, each ISOFIX connector can have its own adjustment mechanism and its own keyed lock and latch.

In yet still one other aspect of the invention, the two opposing components can comprise a keyed component, a housing component which is capable of enclosing a portion of the keyed component when the two components are squeezed together in opposing longitudinal directions, and a spring component which is located between the housing component and the keyed component in squeezable retention and keeps the two components a distance apart by the presence of the spring as would be understood by a person of ordinary skill in the art.

In yet still even another aspect of the invention, the keyed component can have a keyed latch and a perpendicular post both on a rail contacting side thereof, and which keyed latch can be engageable around the post by the turning of a key in a lock from the side opposing the rail contacting side and wherein the housing component can have a divot for accommodating the longitudinal movement of the post when the keyed component and housing component are squeezed together in opposing longitudinal directions when the latch is not engaged In another aspect of the invention, the engaging of the latch around the post can prevent movement of the keyed component and housing component in opposing longitudinal directions due to the interfering presence of an abutment protruding from a rail facing side of the housing component.

In yet even another aspect of the invention, the rails can be capable of extending the longitudinal length of the ISOFIX connection device.

In yet still another aspect of the invention, the engageable ISOFIX latch can be engaged around an automotive ISOFIX bracket without the use of the key lock.

In a second implementation of the invention there can be provided herein a method of securing an object to a car seat comprising:

providing a lockable ISOFIX connection device comprising:

a pair of ISOFIX connectors each having an engageable ISOFIX latch;

a pair of rails wherein each rail supports and encloses a portion of one of the ISOFIX connectors; and, an adjustment mechanism located on an exterior of at least one of the rails which is capable of releasing movement of the connectors within the rails and capable of engaging and disengaging the ISOFIX latch, and wherein the adjustment mechanism has a lock component, which when locked, prevents the adjustment mechanism from releasing movement of the connector and disengagement of the ISOFIX latch;

affixing the ISOFIX connection device to an object along the pair of rails;

securing each of the engageable ISOFIX latches to a separate anchor bracket in a vehicle; and, locking the lock component.

In one aspect of the invention, the method can further comprise extending the ISOFIX rails prior to affixing the ISOFIX connection device, and after securing each of ISOFIX latches can comprise reducing the length of the ISOFIX rails to a length such that the object make contact with a seat back in the vehicle.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1A:
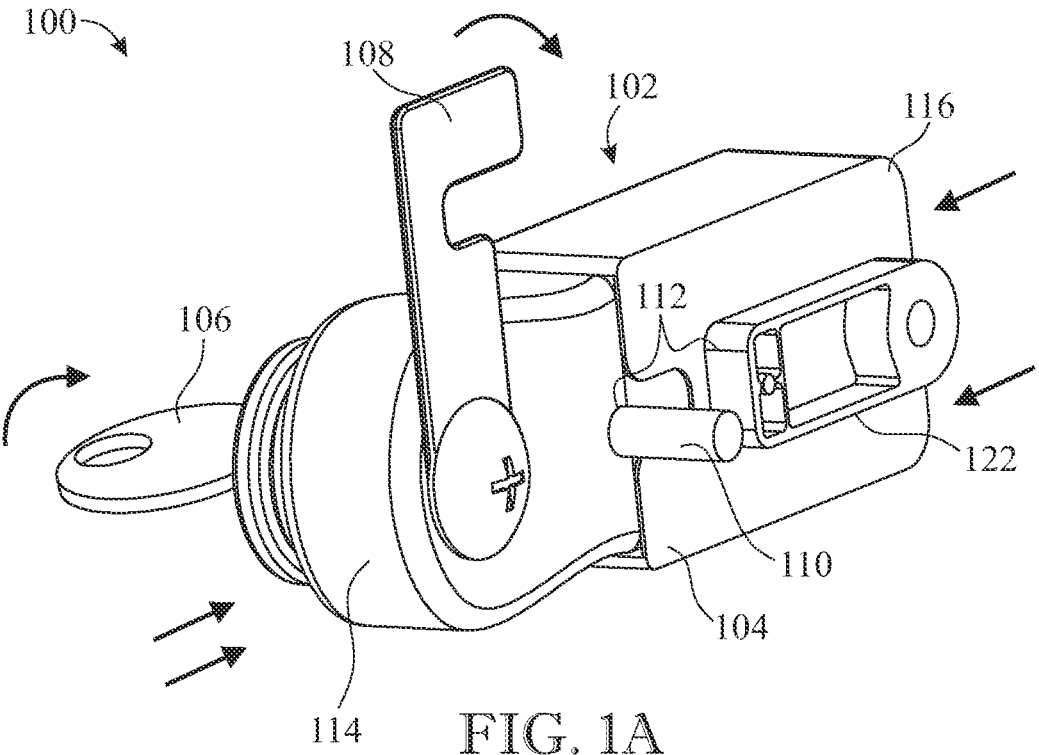
FIG. 1A is a rear view of the adjustment mechanism of the ISOFIX connection device containing a lock and latch thereon for locking the adjustment mechanism in the open position.
Figure 1B:
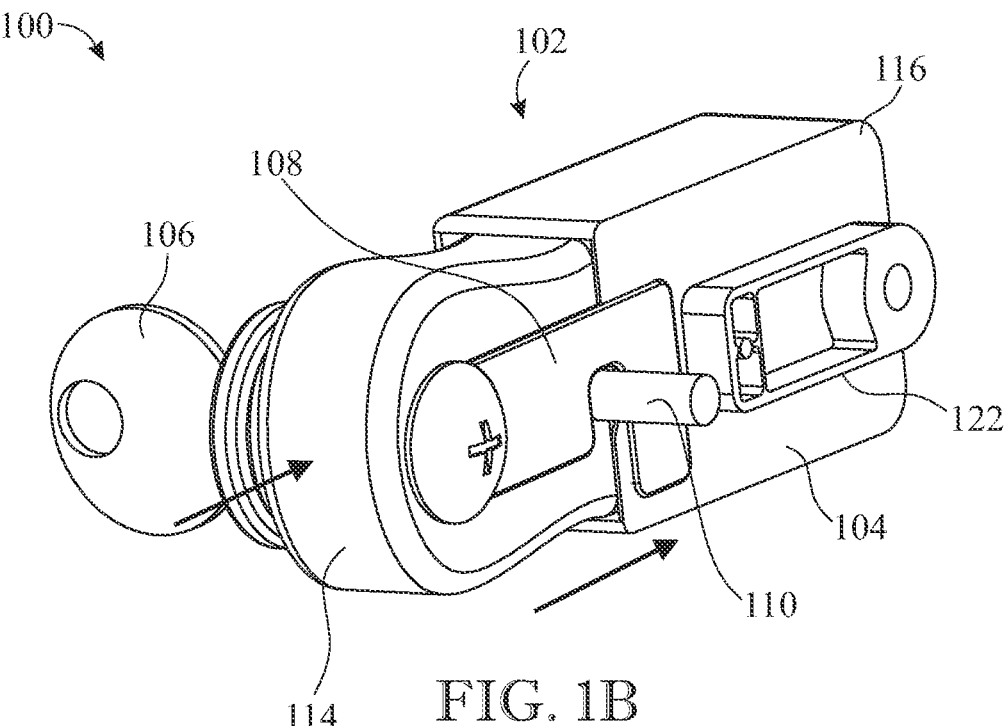
FIG. 1B is a rear view of the adjustment mechanism of the ISOFIX connection device containing a lock and latch thereon for locking the adjustment mechanism in the open position.

Referring initially to FIGS. 1A and 1B, there is provided an adjustment mechanism 100 having a front keyed side 102 and an opposing rail contacting side 104, which can employ a key 106 to turn a lock (not shown) in the adjustment mechanism 100 which turns a keyed latch 108 in the direction of the curved arrow such that the keyed latch 108 partially encircles the post 110.

When in the open position in FIG. 1A, the post 110 is free to move into a divot 112 when the adjustment mechanism is squeezed such that the keyed component 114 is pushed into the housing component 116 in the direction of the straight arrows, which functions to release the ISOFIX latch 118 (see FIG. 4A). in the ISOFIX connector 120. However, in the closed position shown in FIG. 1B, the presence of the keyed latch 108 between the post 110 and the abutment 122 prevents the keyed component 114 and the housing component 116 from being compressed in the direction of the straight arrows and thus, prevents the opening of the ISOFIX latch 118. It is understood that there is a spring or other mechanical component inside the adjustment mechanism 100 which provides for a squeezable connection between the keyed component 114 and the housing component 116.

Preferably the keyed latch 108 enters a space 134 which blocks the two opposing components 114 and 116 from being squeezed together in opposing directions in the normal fashion of releasing the latch of the ISOFIX connector 120. Preferably, each ISOFIX connector 120 can have its own adjustment mechanism 100 and its own keyed lock 106 and latch 108.

Figure 2:
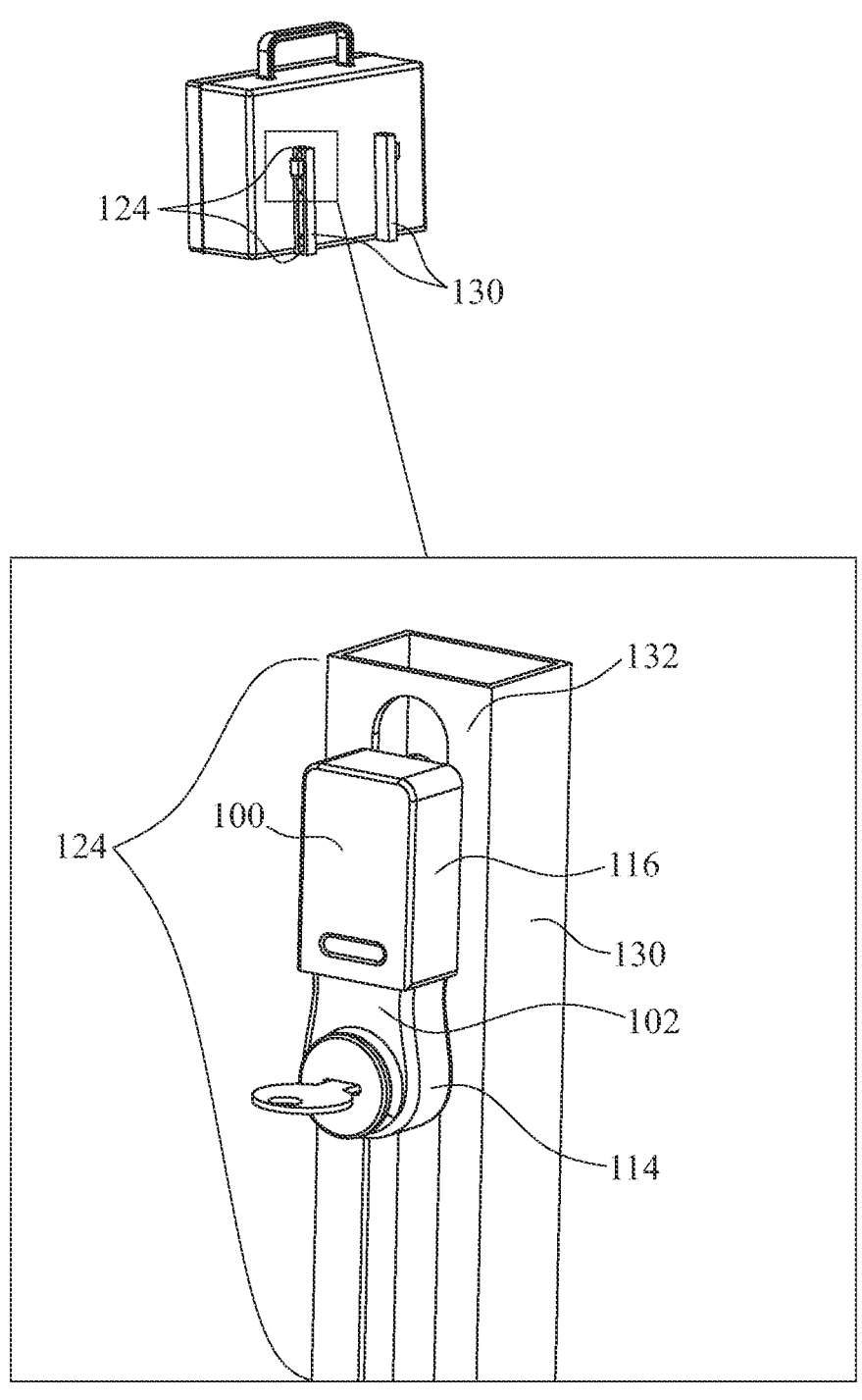
FIG. 2 is a front enlarged view of the adjustment mechanism of the ISOFIX connection device as located on the rails of the ISOFIX connection device.
Figure 5A:
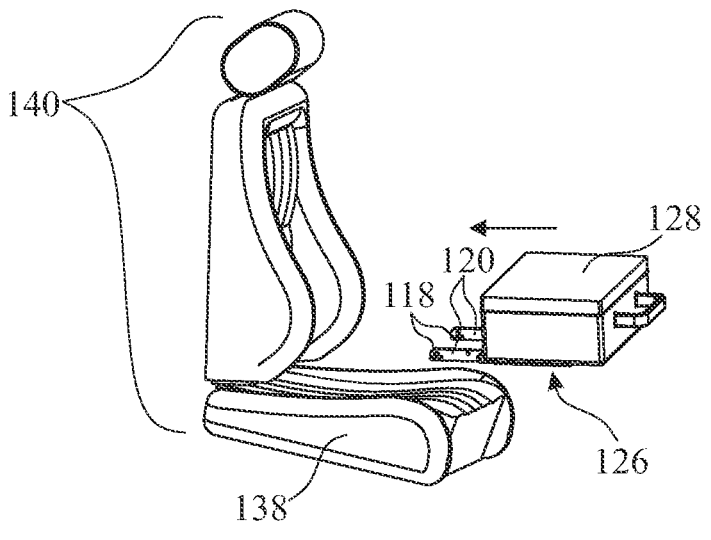
FIG. 5A is a view of the ISOFIX connection device mounted on the bottom of a case showing the direction of attachment to the ISOFIX bracket in the seat of a vehicle.
Figure 5B:
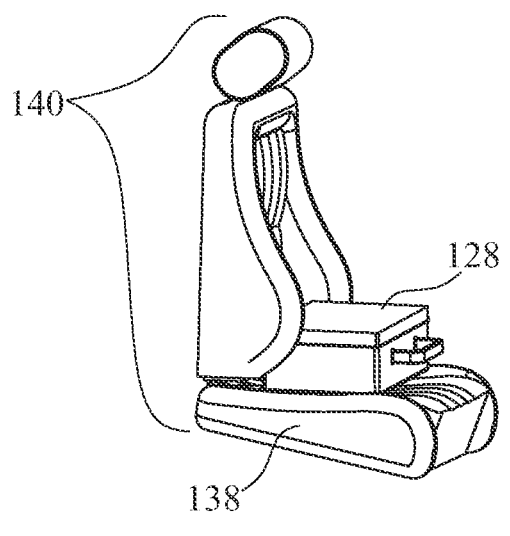
FIG. 5B is a view of the ISOFIX connection device mounted on the bottom of a case when attached to the ISOFIX bracket in the seat of a vehicle.

Referring to FIGS. 2 and 3, the ISOFIX connective device 124 can be attached to a surface 126 of an object 128 to be secured, preferably by the pair of ISOFIX rails 130, preferably along a bottom surface 126 of the object 128, such that the rails 130 make contact with a lower part 138 of a seat 140 of the vehicle (i.e., the portion designed to accommodate the lower part of the body of the person sitting-see FIGS. 5A and 5B), by engaging the latch 118 of the connectors 120

Figure 3A:
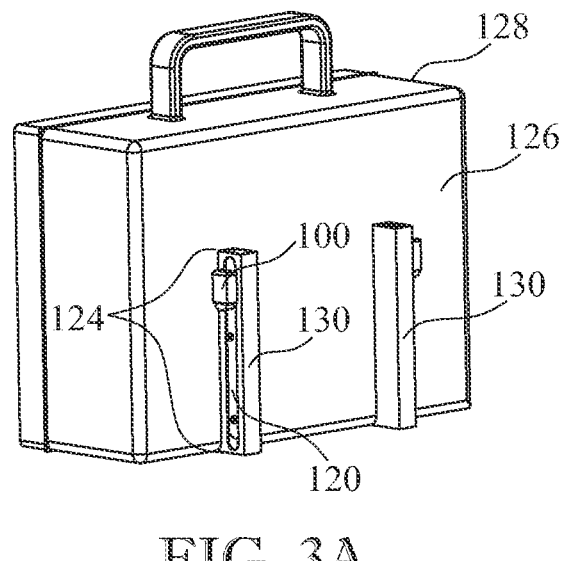
FIG. 3A is view of the ISOFIX connection device affixed to the bottom of an object, i.e., a case wherein the ISOFIX connectors are in the contracted position within the ISOFIX rails.
Figure 3B:
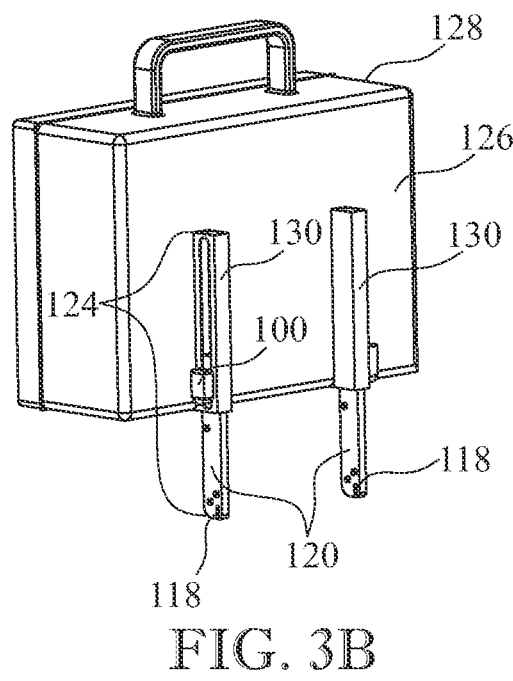
FIG. 3B is view of the ISOFIX connection device affixed to the bottom of an object, i.e., a case wherein the ISOFIX connectors are in the extended position outside of the ISOFIX rails.

The lockable ISOFIX connection device 124 is shown in the contracted view in FIG. 3A and in the extended view in FIG. 3B. The ISOFIX connection device 124 can contain a pair of ISOFIX connectors 120 each having an engageable ISOFIX latch 118, a pair of rails 130 wherein each rail 130 supports and encloses a portion of one of the ISOFIX connectors 120 (in the contracted state); and, an adjustment mechanism 100 located on an exterior side 132 of at least one of the rails 130 which is capable of releasing movement of the connectors 120 within the rails 130 and capable of engaging and disengaging the ISOFIX latch 118, and wherein the adjustment mechanism 100 has a lock component (not shown), which when locked, preferably by a key 106, prevents the adjustment mechanism 100 from releasing movement of the connector 120 from a contracted to extended state, and disengagement of the ISOFIX latch 118.

Each of the rails 130 can contain a separate adjustment mechanism 100 located on an exterior side 132 of the rails 130 thereof, i.e., the side facing away from the object 130 to which the rails 130 can be attached. The rails 130 can be attached by any conventional mechanism such as fasteners or adhesive; e.g. screws, bolts, rivets, and the like.

Figure 4A:
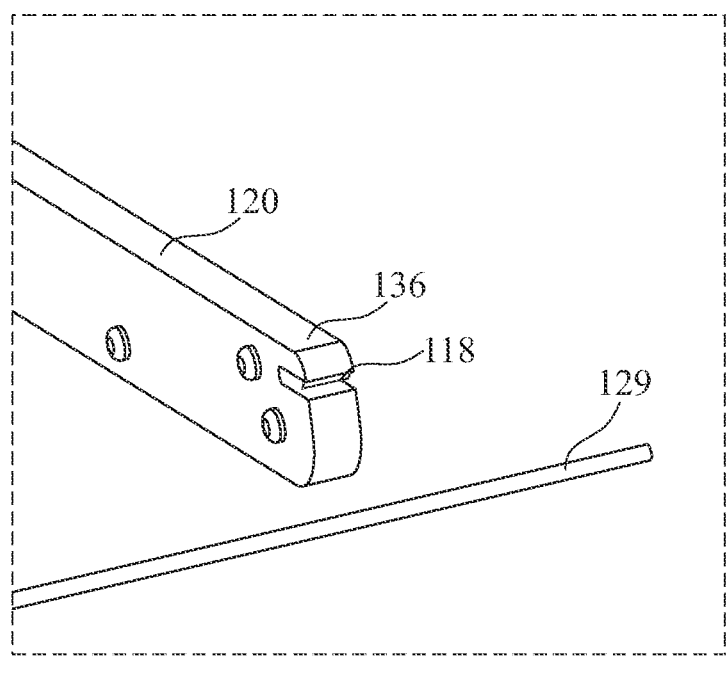
FIG. 4A a view of one of the ISOFIX connectors at the end having the ISOFIX latch prior to engagement with a metal rod simulating the ISOFIX bracket in a vehicle.
Figure 4B:
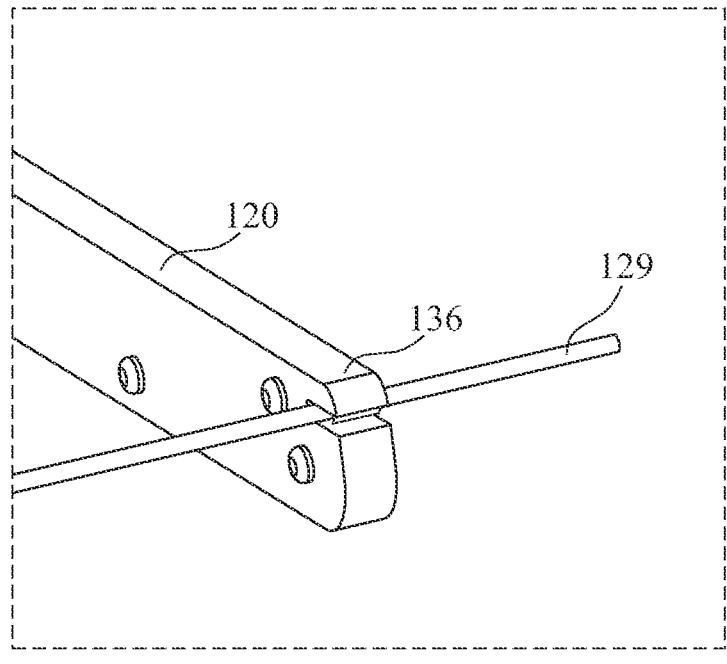
FIG. 4B a view of one of the ISOFIX connectors at the end having the ISOFIX latch after engagement with a metal rod simulating the ISOFIX bracket in a vehicle.

As shown in FIGS. 4A and 4B, the ISOFIX latch 118 can be located at a terminus 136 of the ISOFIX connectors 120 and can be mechanically connected (not shown) to the adjustment mechanism 100 as shown in FIGS. 3A and 3B in the contracted and extended states, respectively. In FIGS. 4A and 4B, the ISOFIX bracket in a vehicle is demonstrated by a rod 129. When the adjustment mechanism 100 is squeezed together as described herein and it is not in the locked state, the adjustment mechanism 100 can also be used to move the ISOFIX connectors 120 from a contracted state to an extended state as shown in FIGS. 3A and 3B, respectively.

Again, referring to FIGS. 1A and 1B, the housing component 116 which is capable of enclosing a portion of the keyed component 114 when the two components 114/116 are squeezed together in opposing longitudinal directions as shown by the straight arrows, and a spring component (not shown) which is located between the housing component 114 and the keyed component 116 in squeezable retention and keeps the two components 114/116 a space 134 apart by the presence of the spring as would be understood by a person of ordinary skill in the art, until such components 114/116 are compressed together in the direction of the arrows, at which point it is understood that the internal spring (not shown) is compressed allowing the two components 114/116 to come together, and wherein then the post 110 engages a mechanical mechanism (not shown) in the connector 120 to disengage the ISOFIX latch 118 and/or to extend the ISOFIX connectors 120 along the length of the rail 130 from a contracted state to an extended state as shown in FIGS. 3A and 3B.

In yet still another aspect of the invention, the engageable ISOFIX latch 118 can be engaged around an automotive ISOFIX bracket 129 without the use of the lock mechanism (not shown) but by merely placing the latch 118 into pressurized contact with the bracket 129 which enable an internal mechanism therein (not shown) to actuate a connection of the ISOFIX latch 118 to the bracket 129 in a manner understood by those of ordinary skill in the art.

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. A lockable ISOFIX connection device comprising:
   a pair of ISOFIX connectors each having an engageable ISOFIX latch;

a pair of rails wherein each rail supports and encloses a portion of one of the ISOFIX connectors; and, an adjustment mechanism located on an exterior of at least one of the rails which is capable of releasing movement of the connectors within the rails and capable of engaging and disengaging the ISOFIX latch, wherein the adjustment mechanism has a lock component, which when locked, prevents the adjustment mechanism from releasing movement of the connector and disengagement of the ISOFIX latch, wherein the adjustment mechanism is engageable by squeezing two opposing components in together in opposing directions, wherein the lock is a keyed lock, and wherein the keyed lock engages a latch, on an opposing side of the keyed side.

2. The lockable the ISOFIX connective device of claim 1, wherein the pair of rails, are configured so as to be able to attach to an object along a top surface of the rails.

3. A system comprising an object to be secured and the lockable ISOFIX connection device of claim 1, wherein the object is selected from a tool box, a lock box, and a cooler.

4. The lockable the ISOFIX connective device of claim 1, wherein each of the rails contains a separate adjustment mechanism located on an exterior side thereof.

5. The lockable the ISOFIX connective device of claim 1, wherein the ISOFIX latch is located at a terminus of the ISOFIX connectors.

6. The lockable the ISOFIX connective device of claim 1, wherein the ISOFIX latch is mechanically connected to the adjustment mechanism.

7. The lockable the ISOFIX connective device of claim 1, wherein the keyed lock is configured such that engaging of the latch causes the latch to enters a space which blocks the two opposing components from being squeezed together in opposing directions.

8. The lockable the ISOFIX connective device of claim 1, wherein each ISOFIX connector has its own adjustment mechanism and its own keyed lock and latch.

9. The lockable the ISOFIX connective device of claim 1, wherein the rails are capable of extending the longitudinal length of the ISOFIX connection device.

10. The lockable the ISOFIX connective device of claim 1, wherein the engageable ISOFIX latch is capable of being engaged around an automotive ISOFIX bracket without the use of the key lock.

11. The lockable the ISOFIX connective device of claim 1, wherein the two opposing components can comprise a keyed component, a housing component which is capable of enclosing a portion of the keyed component when the two components are squeezed together in opposing longitudinal directions, and a spring component which is located between the housing component and the keyed component in squeezable retention and which keeps the two components a distance apart by the presence of the spring.

12. The lockable the ISOFIX connective device of claim 11, wherein the keyed component contains a keyed latch and a perpendicular post both on a rail contacting side thereof.

13. The lockable the ISOFIX connective device of claim 12, wherein the keyed latch is engageable around the post by the turning of a key in a lock from the side opposing the rail contacting side.

14. The lockable the ISOFIX connective device of claim 13, wherein the housing component has a divot for accommodating the longitudinal movement of the post when the keyed component and housing component are squeezed together in opposing longitudinal directions when the latch is not engaged.

15. A method of securing an object to a vehicle seat comprising:

providing a lockable ISOFIX connection device comprising:

a pair of ISOFIX connectors each having an engageable ISOFIX latch;

a pair of rails wherein each rail supports and encloses a portion of one of the ISOFIX connectors; and, an adjustment mechanism located on an exterior of at least one of the rails which is capable of releasing movement of the connectors within the rails and capable of engaging and disengaging the ISOFIX latch, and wherein the adjustment mechanism has a lock component, which when locked, prevents the adjustment mechanism from releasing movement of the connector and disengagement of the ISOFIX latch;

affixing the ISOFIX connection device to an object along the pair of rails;

securing each of the engageable ISOFIX latches to a separate anchor bracket in a vehicle; and, locking the lock component, wherein the adjustment mechanism is engageable by squeezing two opposing components in together in opposing directions, wherein the lock is a keyed lock, and wherein the keyed lock engages a latch, on an opposing side of the keyed side.

16. The method of claim 15 further comprising extending the ISOFIX rails prior to affixing the ISOFIX connection device.

17. The method of claim 16 wherein after securing each of ISOFIX latches the method further comprises reducing the length of the ISOFIX rails to a car seat sitting cushion length.

18. A lockable ISOFIX connection device comprising:

a pair of ISOFIX connectors each having an engageable ISOFIX latch;

a pair of rails wherein each rail supports and encloses a portion of one of the ISOFIX connectors; and, an adjustment mechanism located on an exterior of at least one of the rails which is capable of releasing movement of the connectors within the rails and capable of engaging and disengaging the ISOFIX latch, and wherein the adjustment mechanism has a lock component, which when locked, prevents the adjustment mechanism from releasing movement of the connector and disengagement of the ISOFIX latch, wherein the adjustment mechanism is engageable by squeezing two opposing components in together in opposing directions, and wherein the two opposing components can comprise a keyed component, a housing component which is capable of enclosing a portion of the keyed component when the two components are squeezed together in opposing longitudinal directions, and a spring component which is located between the housing component and the keyed component in squeezable retention and which keeps the two components a distance apart by the presence of the spring.

19. A method of securing an object to a vehicle seat comprising:

providing a lockable ISOFIX connection device comprising:

a pair of ISOFIX connectors each having an engageable ISOFIX latch;

a pair of rails wherein each rail supports and encloses a portion of one of the ISOFIX connectors; and, an adjustment mechanism located on an exterior of at least one of the rails which is capable of releasing movement of the connectors within the rails and capable of engaging and disengaging the ISOFIX latch, and wherein the adjustment mechanism has a lock component, which when locked, prevents the adjustment mechanism from releasing movement of the connector and disengagement of the ISOFIX latch;

affixing the ISOFIX connection device to an object along the pair of rails;

securing each of the engageable ISOFIX latches to a separate anchor bracket in a vehicle; and, locking the lock component, wherein the adjustment mechanism is engageable by squeezing two opposing components in together in opposing directions, and wherein the two opposing components can comprise a keyed component, a housing component which is capable of enclosing a portion of the keyed component when the two components are squeezed together in opposing longitudinal directions, and a spring component which is located between the housing component and the keyed component in squeezable retention and which keeps the two components a distance apart by the presence of the spring.

\* \* \* \* \*